A. R. HUSSEY.
VENDING MACHINE.
APPLICATION FILED JAN. 25, 1909.
999,790.
Patented Aug. 8, 1911.
2 SHEETS—SHEET 1.
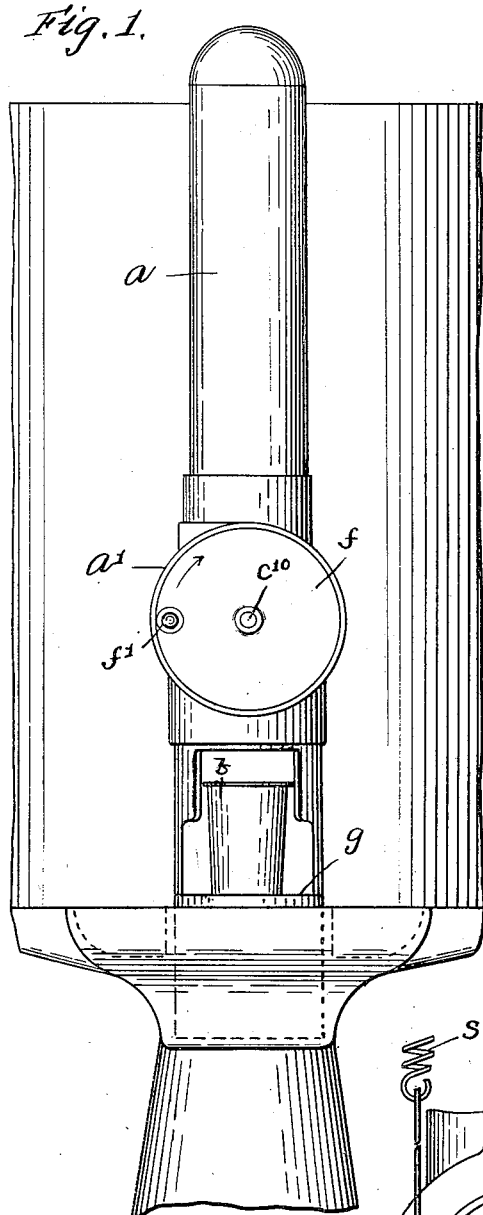
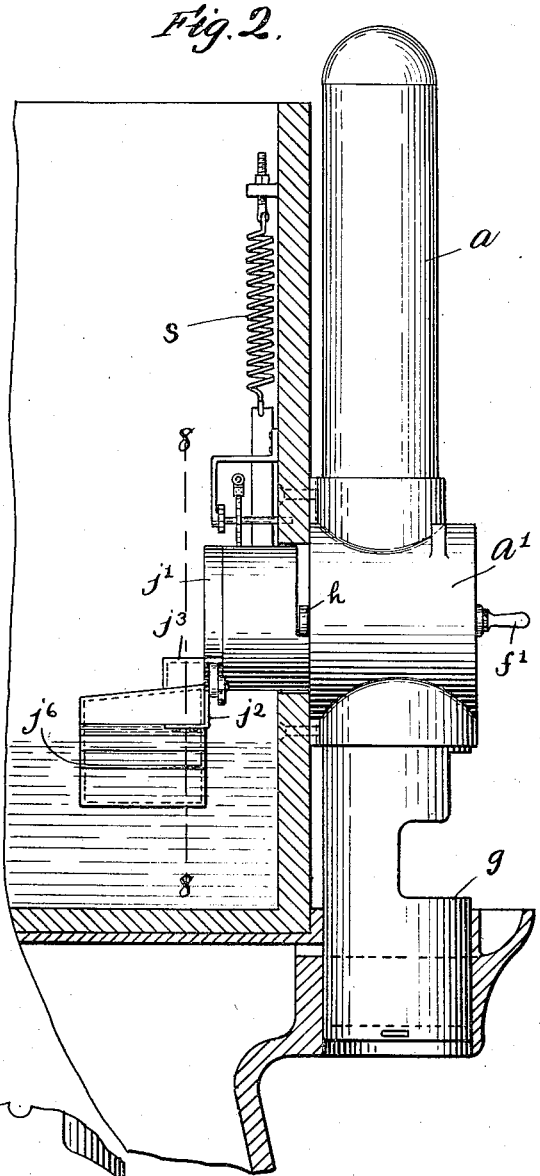
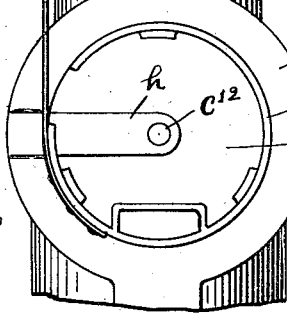

A. R. HUSSEY.
VENDING MACHINE.
APPLICATION FILED JAN. 25, 1909.
999,790.
Patented Aug. 8, 1911.
2 SHEETS—SHEET 2.
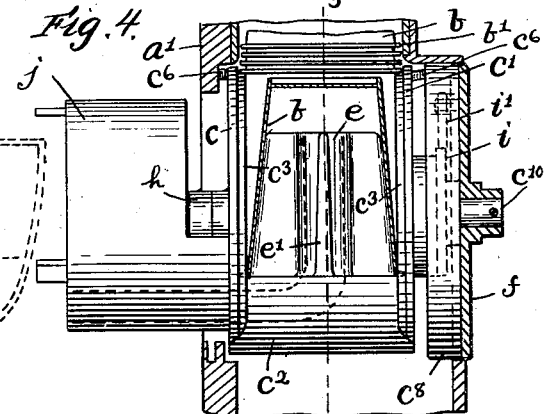
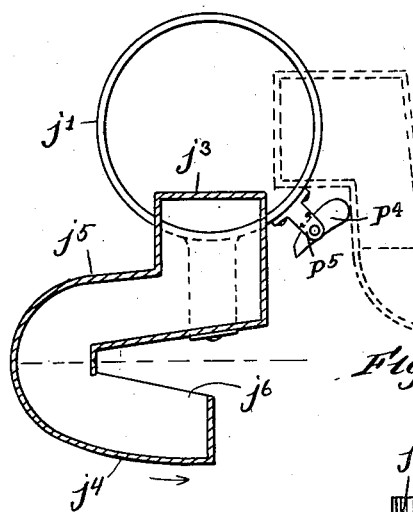
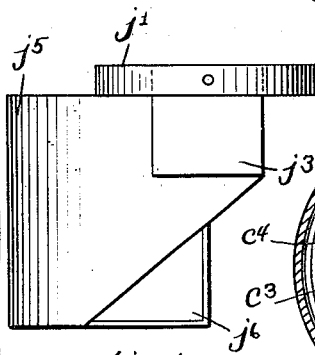
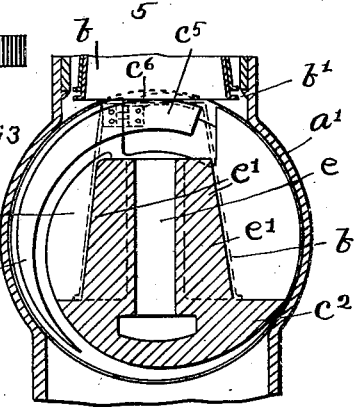
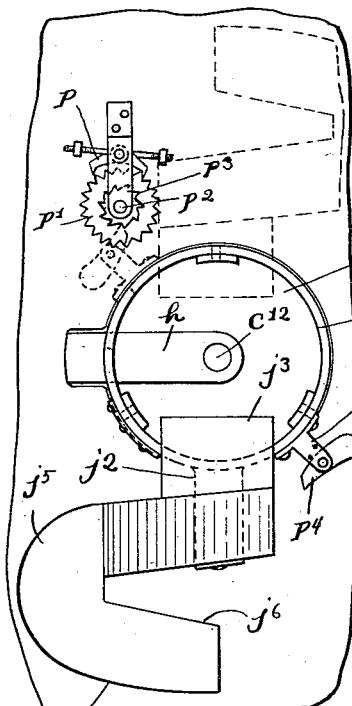
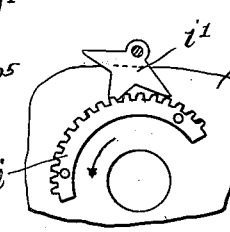
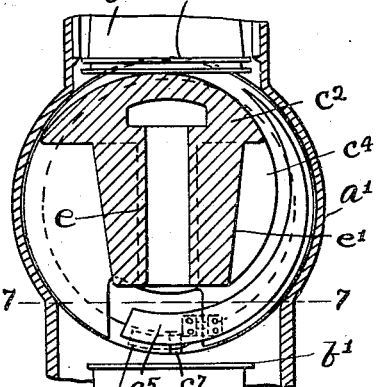
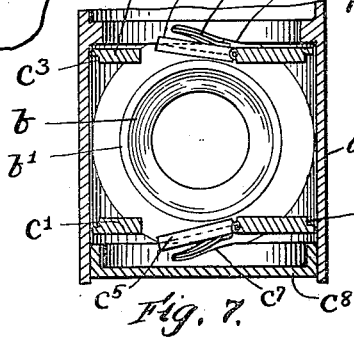
Witnesses:
Cynthia Doyle
H. B. Davis
Inventor:
Alfred R. Hussey
by Hayes & Harriman
Attys.

UNITED STATES PATENT OFFICE.

ALFRED R. HUSSEY, OF HARVARD, MASSACHUSETTS, ASSIGNOR TO AMERICAN WATER SUPPLY COMPANY OF NEW ENGLAND, OF BOSTON, MASSACHUSETTS, A CORPORATION OF MASSACHUSETTS.

VENDING-MACHINE.

999,790.  Specification of Letters Patent.  Patented Aug. 8, 1911.

Application filed January 25, 1909. Serial No. 474,021.

*To all whom it may concern:*

Be it known that I, ALFRED R. HUSSEY, of Harvard, county of Worcester, State of Massachusetts, have invented an Improvement in Vending-Machines, of which the following is a specification.

This invention relates to vending machines and is designed to successively deliver drinking cups and also to deliver measured volumes of water to said cups, whereby by the manipulation of a suitable operating-device the drinking cups will be successively conveyed to and deposited on a suitable support, within easy reach of the operator, and measured volumes of water conducted thereto.

My invention has for its object to improve the construction of the cup-delivering mechanism to the end that the cups may be taken successively from a pile and conveyed to a position above a suitable support or table provided for them, their position being reversed in transit, and then released and permitted to fall on said support by gravity, said releasing-devices being arranged to be operated automatically to release the cups as soon as they are brought into position above the support.

The principal object gained by my improvements in the cup-delivering mechanism is that the cup is automatically placed in position on its support within easy reach of the operator, independently of the operation of the water-delivering devices. If desired, the cup-delivering element of my machine may be used independently of the water-delivering element thereof as shown in my application No. 599,464, filed December 27, 1910, which is a division of this application.

My invention also has for its object to improve the construction of the cup-receiver which is borne by the oscillating member, which is employed to convey the cup to the cup-support.

My invention also has for its object to improve the construction of the water-delivering device to the end that a measured volume of water may be taken directly from a water-container and delivered to a cup which is reposing on the cup-support.

The principal advantage gained by my improvements in the water-delivering device is that the water may be taken directly from the water-container at the moment it is desired to deliver it to the cup, so that its temperature will be the same as the water contained in the container.

Furthermore, my improved form of water-delivering device may be employed independently of the cup-delivering-mechanism if desired.

My invention also has for its object to provide means for preventing backward motion of the oscillating member, which serves as the operating-device, when moved in either direction, thereby necessitating moving the oscillating member its full stroke in both directions.

My invention also has for its object to provide a retarding-device for the oscillating member and means borne by the oscillating member adapted to engage said retarding-device at the beginning of its return stroke, so that movement of said member will be retarded for a short period of time at the beginning of its return stroke in order that sufficient time may be allowed for the water-conveyer to empty.

For the purpose of illustrating my invention the cup-delivering mechanism and the water-delivering device are herein shown as connected with the same operating-device.

Figure 1 is a front elevation of a vending-machine embodying this invention. Fig. 2 is a side elevation of the machine shown in Fig. 1, the water-container and its supporting-frame being broken away. Fig. 3 is an end view of the oscillating-member adapted to operate the water-delivering device and the cup-delivering mechanism. Fig. 4 is a detail showing the oscillating-member and cup-delivering mechanism in side elevation and frame in section. Fig. 5 is a vertical section of the parts shown in Fig. 4, taken on the dotted line 5—5. Fig. 6 is a sectional view similar to Fig. 5, the oscillating-member being inverted to deliver a cup upon the cup-support or to deliver water to the cup. Fig. 7 is a sectional view showing particularly the releasing-devices for the cup, taken on the dotted line 7—7 Fig. 6. Fig. 8 is an enlarged sectional detail of the water-delivering device taken on the dotted line 8—8 Fig. 2. Fig. 9 is an end view of the water-delivering device, showing also the retarding-device by which return movement of the oscillating-member is retarded for a short period of time at the beginning of its return stroke. Fig. 10 is a plan view of the water-delivering device.

Fig. 11 is a detail showing the means for preventing backward motion of the oscillating-member in both directions.

$a$ represents a dome erected upon a hollow frame $a'$ and having within it a chamber of suitable shape and size to receive a pile of cups, represented at $b$, Fig. 4, the cups of said pile being inverted and nested together. The cups each have a lip $b'$ at its upper end and they are successively removed from the pile by means provided for engaging the lips thereof. Within the hollow frame $a'$ an oscillating-member is placed which is adapted to remove a cup from the pile when turned in one direction, and to deliver a cup upon a cup-support when turned in the opposite direction. As herein shown, said oscillating-member also serves as a means for operating the water-delivering device to deliver water to the cup, as will be hereinafter described.

The oscillating-member comprises essentially two disks or end plates $c$, $c'$, suitably spaced apart and joined together by a connecting portion $c^2$. Said disks and connecting portions may be integrally formed if desired. The disks $c$, $c'$ are arranged to fit and turn freely in circular recesses formed in the interior of the hollow frame $a'$, being thus supported by said frame and free to oscillate therein. Said disks have arranged upon their inner or adjacent sides suitable cup-engaging flanges $c^3$, which are made substantially alike and oppositely disposed, and said flanges extend about half way around the disks, near the outer edges thereof. The inner sides of said disks are also provided with bosses, as will be described, and said disks and the flanges and bosses thereon, are made alike or substantially so, hence one only need be described.

The flange $c^3$ is formed with a circular outer edge, see Fig. 5, arranged concentric to the axis of the disk, and a circular inner edge arranged eccentric to said axis, so that said flange will be pointed at one end and will be made of a gradually increasing width toward and preferably to its opposite end. The boss $c^4$ is arranged inside of the flange $c^3$, and its outer edge is curved concentric to the inner edge of the flange and it is disposed a short distance from said flange, so as to form a groove or way between said flange and boss. Said boss does not extend the entire length of the flange but from its point toward but not to its opposite end. The end portion of the flange opposite its point is made movable laterally but in an outward direction only, and, as herein shown, said movable portion $c^5$ is hinged to the immovable portion, and the disk is cut away to provide for such outward movement of said movable portion $c^5$. The movable portion $c^5$ has on its outer side a finger $c^6$, which engages the interior of the frame $a'$, or a plate secured therein. As the disk oscillates said movable portion is held in alinement with the immovable portion until just as it arrives at the end of the stroke, when said finger enters a cam groove $c^7$ formed in the frame, or plate therein, which acts to positively move outward said movable portion.

Referring to Fig. 7 the frame $a'$ is provided with a cam-groove $c^7$ for the finger on the movable portion on one of the disks, and a plate $c^8$ is rigidly secured to the frame $a'$ which is provided with a cam-groove $c^7$ for the finger on the movable portion on the other disk.

The connecting-portion $c^2$ of the oscillating-member which is arranged between the two disks or end supports is provided with a cup-receiver, which as herein shown, consists of a short tubular portion $e$ rising from said connecting-portion $c^2$ and having several laterally extended wings $e'$, four being herein shown, and said wings are made tapering from end to end to thereby form a conical structure to receive upon it an inverted cup, as shown in dotted lines Fig. 5.

One of the disks, as $c'$, has connected with it a disk or plate $f$ which fits a circular opening in one end of the frame $a'$, and which is provided with a hand-piece $f'$ by which it may be turned to oscillate the member. As herein shown, said disk $c'$ has a shouldered arbor $c^{10}$, which extends through a center-hole in the fixed plate $c^8$ and through a center-hole in the disk or plate $f$, and said disk or plate $f$ is secured to said arbor, thereby connecting said disk or plate $f$ with the oscillating-member.

Normally the parts are in the positions shown in Figs. 4 and 5, and at such time the pile of cups rests upon the outer edges of the flanges $c^3$ on the disks $c$, $c'$, of the oscillating-member. As the oscillating-member is given a half turn in one direction by the hand-piece $f'$, as for instance, in a direction toward the right, Fig. 5, its position is reversed, and the conical cup-receiver and other parts are moved into the position shown in Fig. 6, and when in this position the two movable portions $c^5$ of the flanges are caused to swing outwardly, as represented in Fig. 7.

If a cup is reposing on the conical cup-receiver, as it should at such time, it will be free to fall by gravity upon a cup-support $g$, see Fig. 1, which is provided in the frame of the machine beneath the oscillating-member, as it will be seen that the movable portions $c^5$ are swung outward so that the downward path of movement of the cup is unobstructed but unless said portions $c^5$ are swung outwardly the cup on the cup-receiver cannot pass to the cup-support by gravity alone. As the oscillating-member resumes its normal position the pointed ends of the flanges $c^3$ pass over the upper sides of the lip of the lowermost inverted cup of the pile, gradually withdrawing said cup therefrom as the lip follows along the groove or way which is provided between the flanges and the bosses on the disks, while the remaining cups of the pile rest on the outer edges of said flanges, and then as the cup-receiver resumes its upright position the inverted cup passes out of the groove or way and falls by gravity upon said receiver, preparatory to being delivered to the cup-support when the oscillating-member is again operated. Hence it will be seen that as the oscillating-member is moved in one direction the cup which reposes on the cup-receiver will be delivered upon the cup-support and when moved in the opposite direction or returned to its normal position the lowermost cup of the pile will be taken therefrom and delivered to the cup-receiver.

The particular novel features of my invention consist in the movable portions $c^5$ which provide for releasing the cup, permitting it to fall by gravity upon the cup-support, when but not until the cup has been turned into upright position, said movable portions thereby serving as releasing-devices for the cup, and also in the particular construction of the cup-receiver herein shown.

To return the oscillating-member to its normal position after it has been moved in one direction by manipulating the hand-piece $f'$, a spring $s$ is employed which is connected at one end to the frame-work and at the other end to a cylindrical frame $j$, see Figs. 2 and 3.

The other features of the machine thus far specifically described are not of my invention.

The disk $c$ has a journal $c^{12}$ which has its bearings in a bar $h$, see Fig. 3, secured to the frame, and said bar is designed to serve as a limiting stop to limit the movement of the oscillating-member in both directions as will be described. One of the disks, as $c'$, for instance, has arranged on it a toothed sector $i$, see Fig. 11, which is arranged concentrically to its axis, and extends a little less than half a circle, and on the fixed plate $c^8$ a dog $i'$ is loosely pivoted, which engages said toothed sector, and said dog is adapted to be rocked at each end of the sector when disengaged from the sector and by the act of reëngaging the sector at the end thereof, so as to point in different directions as the member bearing the sector is oscillated.

As shown in Fig. 11, said dog points toward the left, and the disk is free to turn in the direction of the arrow, but prevented from backward movement. As soon as the dog disengages the sector, at the end thereof, it is free to be rocked by the act of reëngaging the sector and is thereby pointed toward the right, so that as the disk returns, movement thereof is permitted in a direction opposite the arrow, and backward movement thereof prevented.

Attached to the disk $c$ is a support for the water-scoop or dipper. Said support, as herein shown, is made as a hollow cylinder $j$, open at each end. It is attached to the disk at its lower edge only leaving an open space above said connecting portion for the bar $h$, and said connecting portion by striking against said bar limits the oscillating movement of the oscillating-member. The support for the water-scoop may, however, be otherwise constructed.

$j'$ represents a ring, or, it may be, a plate, which is secured to the outer end of the support $j$ and has a downwardly-extended ear $j^2$.

$j^3$ represents an extension on top of the water-scoop or dipper which extends through the ring $j'$. It has a passage through it in open communication with the compartments of the water-scoop or dipper, and also with passages extending through the solid portion of the cylindrical support $j$ and through the disk $c$ and connecting portions $c^2$ and cup-receiver $e$. Said passages form an unobstructed conduit for the passage of water from the water-scoop or dipper through the cup-receiver; and the cup-receiver serves as a delivery-nozzle at the end of said passage or conduit.

The water-scoop or dipper which I prefer to employ is constructed with two compartments, $j^4$, $j^5$, in open communication with each other and arranged side by side or one above the other. The compartment $j^4$ has an opening $j^6$ for the inlet of the water, and the compartment $j^5$ is in open communication with the passage through the extension $j^3$. The compartment $j^4$ is made large enough to receive a measured volume of water sufficient to fill a cup, and the compartment $j^5$ is made large enough to receive the water from the compartment $j^4$ preparatory to its passing through the conduit. As here shown, the water-scoop or dipper is made U-shaped, one arm of which has the compartment $j^4$, and the other arm the compartment $j^5$. As the water-scoop or dipper is connected with the oscillating-member it will be oscillated with and by said member. The water-scoop or dipper is connected with the oscillating-member in such manner as to extend in a direction opposite the cup-receiver, so that, when the oscillating-member is at rest, the water-scoop or dipper may extend downward and enter the water-container and the cup-receiver may extend upward, but, as said member is given a half turn in one direction, and the position of the cup-receiver is thereby reversed, said water-scoop or dipper will be raised, moving in the arc of a circle about the axis of the oscillating-member. This provides for the compartment $j^4$ entering the water in the water-container and becoming entirely submerged, to be completely filled as the oscillating-member is given a half turn in one direction, and also provides for the water passing from the compartment $j^4$ to the compartment $j^5$ and thence through the conduit as the oscillating-member is given a half turn in the opposite direction. Thus, by operating said oscillating-member, as, for instance, by manipulating the hand-piece $f'$, a measured volume of water will be taken from the water-container and conducted to the conduit and delivered to the cup, the delivery taking place when the cup is resting on the cup-support ready to receive it. By making the water-scoop or dipper U-shaped, as here shown, it will be seen that in all positions which it may occupy while being turned to deliver the water, ample space is afforded for the passage of the water.

The level of the water in the water-container will be maintained by any usual or suitable means, which it is not deemed necessary to herein describe.

As the oscillating member is given a half turn to deliver the water, if the hand piece should be immediately disengaged the oscillating member will be immediately returned by the spring $s$, and in such case all the water might not be delivered to the cup, hence I prefer to employ some means for retarding the return movement of the oscillating-member at this time, to insure all the water being delivered. As herein shown, a retarding device is employed which is adapted to be engaged at the beginning of the return stroke of the oscillating member to retard the movement of such member for a short period of time. The retarding device herein shown consists of a pallet $p$, suitably weighted, which engages an escape wheel $p'$, secured to a shaft $p^2$ bearing a ratchet wheel $p^3$, adapted to be engaged by a dog $p^4$ mounted on an arm $p^5$ attached to the frame $j$ of the oscillating-member. When the oscillating-member is given a half turn said dog is moved into engagement with the ratchet-wheel $p^3$, see Fig. 9, and on the return movement thereof operates to turn said ratchet wheel and thereby rotate the escape wheel. The dog remains in engagement with the ratchet wheel but a short period of time which, however, is sufficient to retard or impede the movement of the oscillating member sufficiently to insure all the water being delivered before the oscillating-member returns.

In lieu of the particular form of retarding device herein shown, any other suitable form may be employed.

Having thus described my invention, what I claim as new and desire to secure by Letters Patent is:—

1. In a vending-machine wherein cups are successively taken from a pile and conveyed to a cup-support, the combination with a cup-support, of an oscillating-member having a cup-receiver arranged to support a cup in inverted position and to deliver said cup in upright position to said cup-support, said member having a passage through it which extends through the cup-receiver, and a water-scoop attached to said oscillating-member which is open at one end for the inlet of water and its other end is in open communication with the passage through said member, substantially as described.

2. In a vending-machine wherein cups are successively taken from a pile and conveyed to a cup-support, the combination with a cup-support, of an oscillating-member having a cup-receiver arranged to support a cup in inverted position and to deliver said cup in upright position to said cup-support, said member having a passage through it which extends through the cup-receiver, and a water-scoop attached to said oscillating-member which is open at one end for the inlet of water and its other end is in open communication with the passage through said member, and means connected with said oscillating-member to engage and remove the lowermost cup from the pile and transfer it to the cup-receiver, substantially as described.

3. In a vending machine wherein cups are successively taken from a pile and conveyed to a cup-support, the combination of an oscillating-member bearing the cup-receiver, a water-scoop attached to said member having two compartments in open communication, and arranged side by side, one having an opening for the inlet of water, and the other being in open communication with a passage which extends along said oscillating-member and through the cup-receiver, substantially as described.

4. In a vending machine, the combination of an oscillating-member having a water-scoop attached to it in open communication with a delivery conduit, a retarding-device, and means borne by said member for engaging said retarding-device at the beginning of the return stroke to retard the movement of said member for a short period of time, substantially as described.

5. In a vending-machine wherein cups are successively taken from a pile and conveyed to a cup-support, the combination with a cup-support, of an oscillating-member having a cup-receiver and a passage extended through it and through the cup-receiver, and having means for removing the lowermost cup from the pile when turned in one direction, and for delivering the cup to the cup-support when turned in the opposite direction, and a water-scoop attached to said oscillating-member adapted to enter the water-container, which is open at one end for the inlet of water and its other end is in open communication with the passage through said member, substantially as described.

6. In a vending-machine wherein cups are successively taken from a pile and conveyed to a cup-support, the combination with a cup-support, of an oscillating-member having a cup-receiver and a passage extended through it and through the cup-receiver and having means for removing the lowermost cup from the pile when turned in one direction, and for delivering the cup to the cup-support when turned in the opposite direction, and a water-scoop attached to said oscillating-member adapted to enter a water-container said scoop being open at one end for the inlet of water, and its other end being in open communication with the passage through said member, said water-scoop and cup-receiver being extended in opposite ways, substantially as described.

7. In a vending-machine wherein cups are successively taken from a pile and conveyed to a cup-support, the combination with a cup-support, of an oscillating-member having a cup-receiver and having means for removing the lowermost cup from the pile, permitting it to fall upon said receiver when said member is turned in one direction, and for delivering said cup to the cup-support when turned in the opposite direction, and means connected with said oscillating-member for taking a measured volume of water from a reservoir and delivering it to the cup reposing on the cup-support by a continuous operation when the oscillating-member is turned to deliver the cup to the cup-support, whereby the water which is delivered to the cup is taken directly from the reservoir, substantially as described.

8. A vending-machine comprising a reservoir for water, a receiver for a pile of cups, a water-scoop constructed and arranged to take a measured volume of water from the reservoir and deliver it to a cup, and means for delivering a cup into position to receive the water from the water-scoop and for also operating said water-scoop, substantially as described.

9. A vending-machine comprising a reservoir for water, a receiver for a pile of cups, a water-scoop constructed and arranged to take a measured volume of water from the reservoir and deliver it to a cup, and oscillating-means for delivering a cup into position to receive the water from the water-scoop and for also operating said water-scoop when moved in one direction, and for taking another cup from the pile, preparatory to delivering it, and for returning the water-scoop when moved in the opposite direction, substantially as described.

In testimony whereof, I have signed my name to this specification, in the presence of two subscribing witnesses.

ALFRED R. HUSSEY.

Witnesses:
AMOS L. TAYLOR,
E. A. ALLEN.